United States Patent
Bilston et al.

(10) Patent No.: US 11,511,603 B2
(45) Date of Patent: Nov. 29, 2022

(54) DUST REDUCTION DEVICE

(71) Applicant: Dometic Sweden AB, Solna (SE)

(72) Inventors: David Bilston, Endeavour Hills (AU); Nicolas Chevalier, Camberwell (AU); Jason Svarc, Kinglake West (AU)

(73) Assignee: Dometic Sweden AB, Solna (SE)

( * ) Notice: Subject to any disclaimer, the term of this patent is extended or adjusted under 35 U.S.C. 154(b) by 312 days.

(21) Appl. No.: 16/881,529

(22) Filed: May 22, 2020

(65) Prior Publication Data

US 2020/0376933 A1 Dec. 3, 2020

(30) Foreign Application Priority Data

May 27, 2019 (AU) .................................. 2019901797

(51) Int. Cl.
*B01D 46/00* (2022.01)
*B60H 3/06* (2006.01)
*B01D 46/10* (2006.01)
*B60H 3/02* (2006.01)

(52) U.S. Cl.
CPC ............ *B60H 3/0608* (2013.01); *B01D 46/10* (2013.01); *B60H 3/024* (2013.01)

(58) Field of Classification Search
CPC ............ B01D 46/0004; B01D 46/0031; B01D 46/004; B01D 46/10; B01D 46/12; B01D 2279/40; B60H 1/00364; B60H 3/024; B60H 3/0608; B60H 3/0641
See application file for complete search history.

(56) References Cited

U.S. PATENT DOCUMENTS

| | | |
|---|---|---|
| 2,232,108 A | 2/1941 | Giacomini |
| 2,550,353 A | 4/1951 | Hopfinger |
| 3,552,097 A * | 1/1971 | Grasseler ........... B60H 1/00378 261/DIG. 4 |
| D259,708 S | 6/1981 | Swinstead |
| 4,530,817 A | 7/1985 | Hoelter et al. |

(Continued)

FOREIGN PATENT DOCUMENTS

| | | |
|---|---|---|
| AU | 2007288110 B2 | 10/2013 |
| AU | 2017232204 A1 † | 4/2018 |

(Continued)

OTHER PUBLICATIONS

Examination Report Issued in Australia Application No. 2017227050 dated Feb. 14, 2022.

(Continued)

*Primary Examiner* — Frank M Lawrence, Jr.
(74) *Attorney, Agent, or Firm* — Middleton Reutlinger

(57) ABSTRACT

A dust reduction device for a vehicle includes an inlet aperture for receiving airflow created as a result of forward movement of the vehicle. The dust reduction device provides a primary airflow path leading from the inlet aperture to a vehicle opening, and a secondary airflow path leading from the inlet aperture to a ventilation exit. During forward movement of the vehicle, the primary airflow path is substantially blocked by airflow from the secondary airflow path such that airflow from the primary airflow path is provided to the vehicle opening and into the vehicle thereby minimising dust ingress in the vehicle.

17 Claims, 3 Drawing Sheets

(56) References Cited

U.S. PATENT DOCUMENTS

| | | | |
|---|---|---|---|
| D282,000 S | 12/1985 | Madl | |
| 4,672,818 A * | 6/1987 | Roth | B60H 1/00535 |
| | | | 62/298 |
| 4,953,449 A | 9/1990 | Jackson | |
| D344,791 S | 3/1994 | Cunning | |
| D354,343 S | 1/1995 | Goldstein | |
| 5,679,074 A | 10/1997 | Siegel | |
| D396,526 S | 7/1998 | Boyle | |
| 5,810,896 A * | 9/1998 | Clemens | B60H 1/00028 |
| | | | 55/482 |
| D419,241 S | 1/2000 | Northcott | |
| D429,804 S | 8/2000 | Rossman | |
| D446,577 S | 8/2001 | Barker | |
| D450,111 S | 11/2001 | Stanley | |
| D543,611 S | 5/2007 | Tateishi | |
| D563,538 S | 3/2008 | Verdura | |
| D884,131 S | 5/2020 | Zhu | |
| D903,072 S | 11/2020 | Gu | |
| 11,247,537 B2 | 2/2022 | Chevalier | |
| 2005/0160709 A1 | 7/2005 | Hollis | |
| 2020/0215879 A1 | 7/2020 | Chevalier | |
| 2020/0376933 A1 | 12/2020 | Bilston et al. | |

FOREIGN PATENT DOCUMENTS

| | | |
|---|---|---|
| AU | 2017227050 A1 | 8/2018 |
| AU | 201916406 | 12/2019 |
| AU | 201916408 | 12/2019 |
| AU | 201916409 | 12/2019 |
| EM | 006567111-0001 | 6/2019 |
| EM | 006567111-0002 | 6/2019 |
| EM | 006567111-0003 | 6/2019 |
| EP | 1122105 A2 | 8/2001 |
| EP | 1870270 A1 | 12/2007 |
| FR | 2391865 A1 | 12/1978 |
| GB | 1598029 A | 9/1981 |
| WO | 2017149442 A1 | 9/2017 |

OTHER PUBLICATIONS

Notice of Allowance Issued in U.S. Appl. No. 29/715,592 dated Feb. 23, 2022.
Final Office Action Issued in U.S. Appl. No. 16/080,924 dated Jul. 12, 2021.
Notification of Grant Issued in CN Application No. 201930646821.6 dated Jul. 14, 2020.
AU Patent Application No. 2016900723 entitled "Dust contol vent" filed on Feb. 29, 2016.
AU Provisional Patent Application No. 2019901797 entitled "Dust reduction device" filed on May 27, 2019.
U.S. Appl. No. 16/080,924 entitled "Positive Pressure Vent for a Vehicle" filed Aug. 29, 2018.
CN Patent Application No. 201930646821.6 entitled "Rooftop box for a dust reduction system" filed on Nov. 22, 2019.
AU Patent Application No. 201916406 entitled "Rooftop Air vent" filed on Nov. 11, 2019.
AU Patent Application No. 201916408 entitled "Rooftop Air vent" filed on Nov. 11, 2019.
AU Patent Application No. 201916409 entitled "Rooftop Air vent" filed on Nov. 11, 2019.
Design U.S. Appl. No. 29/715,592 entitled "Filter Housing" filed Dec. 3, 2019.
Office action CN Patent Application No. 201930646821.6 dated Apr. 13, 2020.
International Preliminary Report on Patentability Mailed in PCT Patent Application No. PCT/IB2017/051153 dated Sep. 4, 2018.
International Search Report and Written Opinion Mailed in PCT Patent Application No. PCT/IB2017/051153 dated May 18, 2017.
Non Final Office action U.S. Appl. No. 16/080,924 dated Jan. 7, 2021.
USPTO, Office Action in U.S. Appl. No. 29/715,592 dated Oct. 4, 2021.
Notice of Allowance Issued in U.S. Appl. No. 16/080,924 dated Oct. 6, 2021.
Corrected Notice of Allowance Issued in U.S. Appl. No. 16/080,924 dated Oct. 20, 2021.
Design U.S. Appl. No. 29/840,307 entitled "Filter Housing" filed May 27, 2022.
Notice of Grant issued in Australia Patent Application No. 2017227050 dated Sep. 1, 2022.
Australian Patent Application No. 2022228161 titled "Positive pressure vent for a vehicle" filed Sep. 8, 2022.

\* cited by examiner
† cited by third party

DUST REDUCTION DEVICE

FIELD OF INVENTION

The present embodiments relate to dust reduction devices and in particular to dust reduction devices for vehicles.

The embodiments have been developed primarily for use as a dust reduction device for a recreational vehicle and will be described hereinafter with reference to this application. However, it will be appreciated that the invention is not limited to this particular field of use.

BACKGROUND

The following discussion of the prior art is intended to place the invention in an appropriate technical context and enable the associated advantages to be fully understood. However, any discussion of the prior art throughout the specification should not be considered as an admission that such art is widely known or forms part of the common general knowledge in the field.

When travelling in dusty environments, recreational vehicles such as mobile homes and caravans and also mining trucks suffer from dust ingress as a result of a negative pressure which develops inside the vehicle while moving. The negative pressure is due to the air currents moving around the vehicle, which cause the dusty turbulent air to enter the vehicle through ventilation apertures and general venting, which consequently deposits dust inside.

In order to address this problem, it is known in the prior art to provide a small hatch in the roof of the vehicle called a "pressure hatch" or a "scupper vent". The hatch, when opened at an angle facing towards the direction of motion, scoops air into the vehicle from the passing airstream to force it in into the vehicle and create a net positive pressure inside the vehicle. While such a device is simple and seemingly effective, it has a number of drawbacks. Primarily, pressure hatches or scupper vents will only work when they are opened by a user. In this regard, given their position on mobile homes and caravans, they are often difficult to access and as a result, rarely opened. Compounding this problem, even if they are opened, they allow rain to enter the vehicle when opened.

A further problem with pressure hatches or scupper vents is that even if it not raining, gravel, insects and some dust enters through the vent, which is particularly problematic given the position of the vents when installed.

Another known approach to alleviate the problem of dust ingress is to attempt to cover all apertures through which dust may enter the vehicle, such as refrigerator vents and cross-flow vents. This is generally ineffective as it is usually impossible to cover all apertures and also is very time-consuming. This solution can also be dangerous as when cooking gas is used and/or to leave the vents closed when inhabiting the vehicle due to potential suffocation.

A further known and more complex solution implemented on one brand of recreational vehicle involves use of a high-pressure tank, pump, filters and low-pressure air bladders to always maintain a positive air pressure inside the vehicle. This solution is particularly expensive, cumbersome, adds significant weight and is known to be not fully effective.

It is an object of the present embodiments to overcome or ameliorate at least one of the disadvantages of the prior art, or to provide a useful alternative.

It is an object of the present embodiments in at least one preferred form to provide an improved system for the prevention of dust ingress in moving vehicles.

It is a further object of the present embodiments, in at least one preferred form, to provide an improved system for the prevention of dust ingress in moving vehicles that can also provide ventilation to the vehicle when not moving.

SUMMARY OF THE INVENTION

According to one aspect, there is provided a dust reduction device for a vehicle including:
  an inlet aperture for receiving airflow created as a result of forward movement of the vehicle;
  a primary airflow path leading from the inlet aperture to a vehicle opening; and
  a secondary airflow path leading from the inlet aperture to a ventilation exit,
  wherein, during the forward movement of the vehicle, the primary airflow path is substantially blocked by airflow from the secondary airflow path such that airflow from the primary airflow path is provided to the vehicle opening and into the vehicle thereby minimising dust ingress in the vehicle.

In one embodiment, during the forward movement of the vehicle, airflow from the primary airflow path creates a positive pressure inside the vehicle thereby minimising dust ingress.

In one embodiment, the primary airflow path is in fluidic communication with the ventilation exit.

In one embodiment, during non-forward movement of the vehicle, a ventilation pathway is created between the vehicle opening and the ventilation exit.

In one embodiment, the primary airflow path includes a pair of horizontally spaced primary inlet channels.

In one embodiment, each primary inlet channel leads to a bend portion for turning the airflow in an opposite direction during the forward movement of the vehicle.

In one embodiment, each bend portion includes a vertically oriented slot for allowing moisture egress.

In one embodiment, each slot is in fluidic communication with a drainage area having a drainage hole disposed on a lower surface thereof.

In one embodiment, each primary inlet channel includes a gutter for collecting water during the forward movement of the vehicle.

In one embodiment, each primary inlet channel includes one or more obliquely extending water passages disposed on a lower surface thereof, the water passages providing a path for any contained water into the gutter.

In one embodiment, the device includes an air delivery plenum downstream of the bend portions.

In one embodiment, the device includes a filter located in the primary airflow path, the filter being upstream of the vehicle opening.

In one embodiment, the filter is vertically disposed.

In one embodiment, the device includes a debris catcher located in the primary airflow path.

In one embodiment, the debris catcher also houses the filter.

In one embodiment, the debris catcher is removable from the inside of the vehicle such that any contained debris may be removed, and/or the filter may be cleaned or replaced.

In one embodiment, the ventilation exit is disposed in a top surface of the device.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF DRAWINGS

Various embodiments of the invention will now be described, by way of example only, with reference to the accompanying drawings in which.

DETAILED DESCRIPTION

Figure 1:
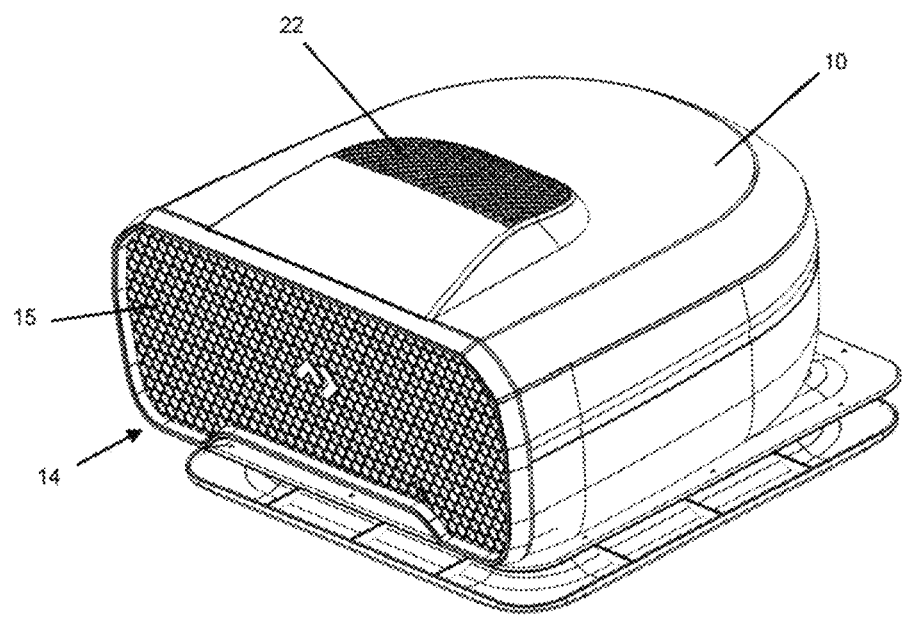
FIG. 1 is a perspective view of a dust reduction device in accordance with one embodiment.

Exemplary embodiments will now be described in detail with reference to the accompanying drawings. In the drawings, the same elements are denoted by the same reference numerals throughout. In the following description, detailed descriptions of known functions and configurations incorporated herein have been omitted for conciseness and clarity.

Figure 2:
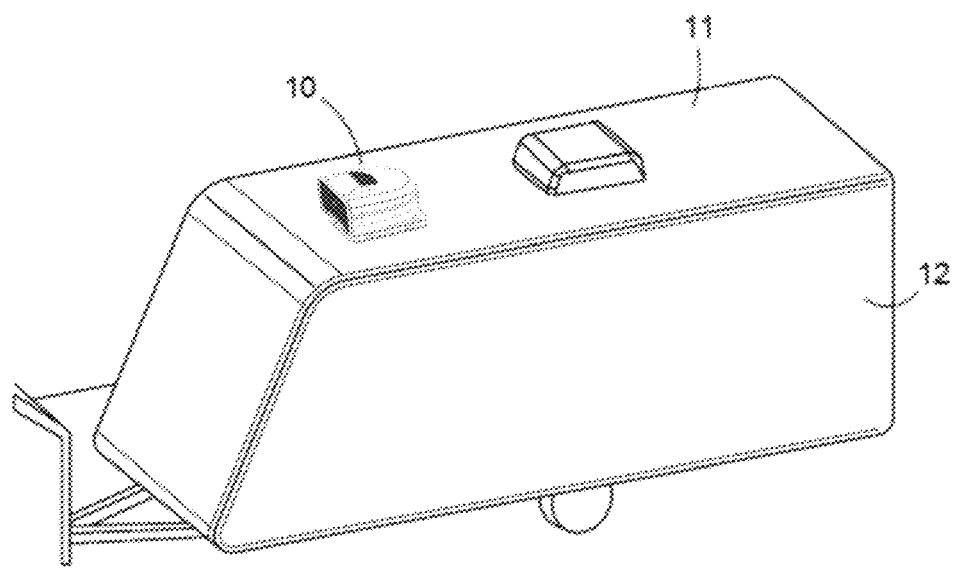
FIG. 2 is a perspective view of a recreational vehicle with the dust reduction device of FIG. 1 installed on its roof.

Referring to the accompanying drawings and initially to FIGS. 1 and 2, there is shown a dust reduction device 10 for a vehicle 12 such as a caravan, recreational or mining vehicle. In the present embodiment, the device 10 is installed in the front portion of the roof 11 of a caravan 12, well away from turbulent flow and substantial dust at a rear of the vehicle. However, in other not shown embodiments, the device 10 may be placed in any position on a vehicle that has access to airflow due to the forward motion of the vehicle. In one alternative location, the vent may be installed in a hatch in the roof of the vehicle.

Figure 3:
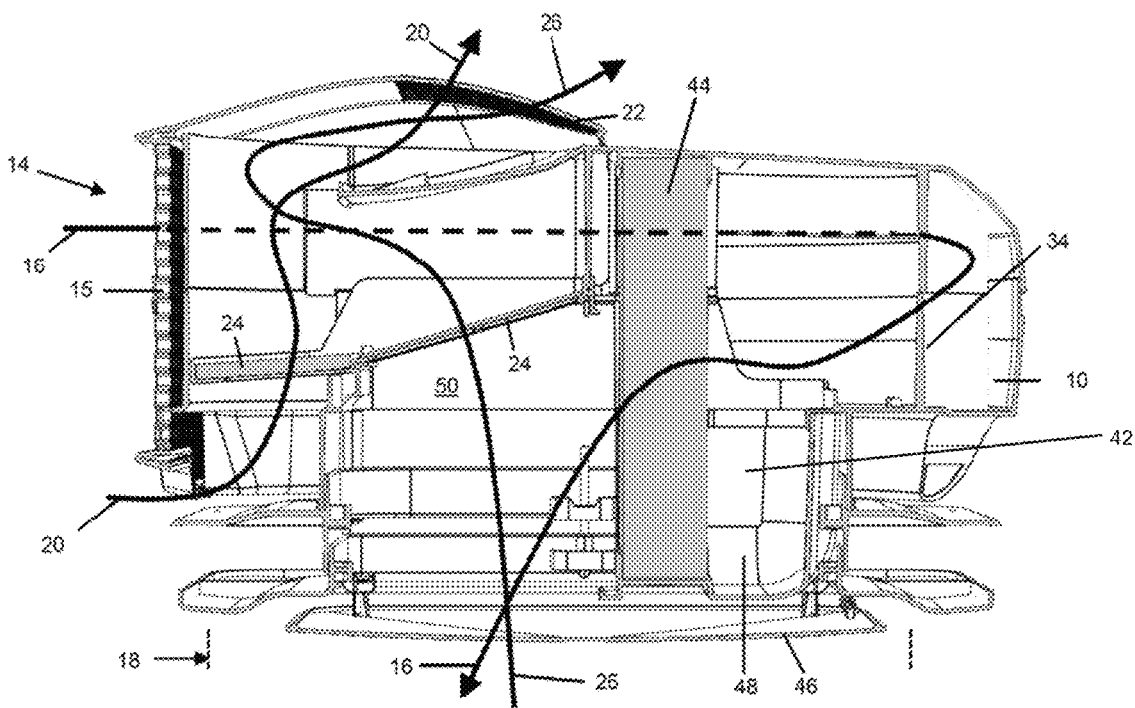
FIG. 3 is a sectional side view of the dust reduction device of FIG. 1.

As best shown in FIG. 3, during forward movement of the vehicle 12 airflow enters the device through 10 through an inlet aperture 14 having a grille 15. The airflow generated by the forward motion is split into a primary airflow path 16 and a secondary airflow path 20. Primary airflow path 16 travels from the inlet aperture 14, through the device 10, into to a vehicle opening 18 and into the vehicle. Secondary airflow path 20 leads from a lower portion of the inlet aperture 14 and travels directly to a ventilation exit 22 on top of the device. The arrangement is such that whilst there is possible fluid communication between the primary airflow path 16 and the ventilation exit 22, during forward movement of the vehicle 12, the secondary airflow path generally blocks the airflow from the primary airflow path 16 thereby promoting a substantial portion of the airflow from the primary airflow path to enter the vehicle 12 through vehicle opening 18. More specifically, during the forward movement of the vehicle, airflow from the primary airflow path 16 enters the vehicle through vehicle opening 18 and creates a positive pressure inside the vehicle thereby minimising dust ingress into the vehicle. Airflow is distributed throughout the vehicle by way of a diffuser 46.

According to a further aspect of the embodiments, when the vehicle is not moving in a forward direction, it should be appreciated that there would will be insufficient airflow entering the inlet opening 14. Under these circumstances, a ventilation pathway 26 is created between the vehicle opening 18 and the ventilation exit 22. In this way, free-flow ventilation is provided to the inside of the vehicle while it is stationary. This free flow ventilation is required for most regulatory authorities in the design of recreational vehicles. Porous foam portions 24 have also been provided to stop insect and bug entry during this stage.

Figure 4:
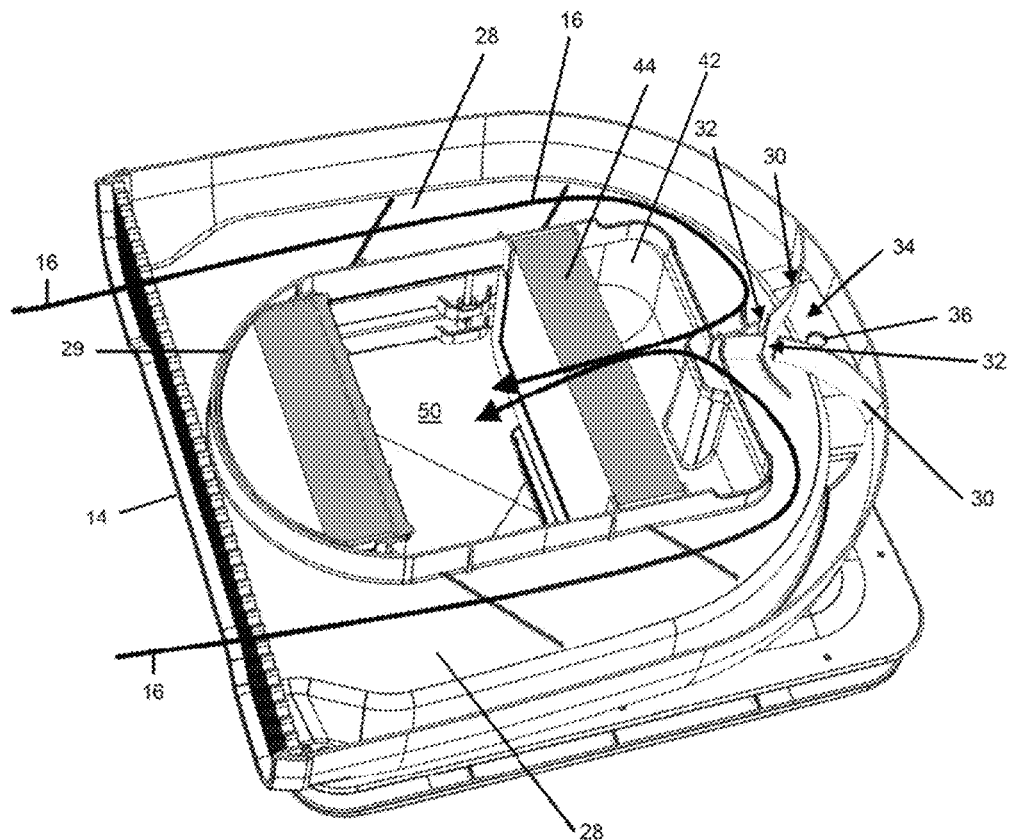
FIG. 4 is a sectional top perspective view of the dust reduction device of FIG. 1.

Referring now to FIG. 4, airflow travelling along the primary airflow path 16 is split into a pair of horizontally spaced primary inlet channels 28. For this reason, there is provided smooth curved surface 29 for evenly bifurcating the airflow. Each primary inlet channel 28 leads to a bend portion 30 for turning the airflow in an opposite 180° direction during the forward movement of the vehicle. Each bend portion 30 includes a vertically oriented slot 32 for allowing moisture egress. The slots 32 are in fluidic communication with a drainage area 34 having a drainage hole 36 disposed on a lower surface thereof. It should be understood that during forward movement of the vehicle, any contained moisture will be promoted through slots 32 due to the centrifugal force generated when the airflow turns 180°. In this respect, the airflow travelling along the primary airflow path 16 changes direction by 180° in the horizontal plane, and then 90° in the vertical plane to enter the vehicle, which allows moisture to be separated and removed from the airflow. In this way, during forward movement any moisture in the airflow, such as during periods of rain, will be directed through slots 32 and out of the rear of the device 10 through drainage hole 36.

Figure 5:
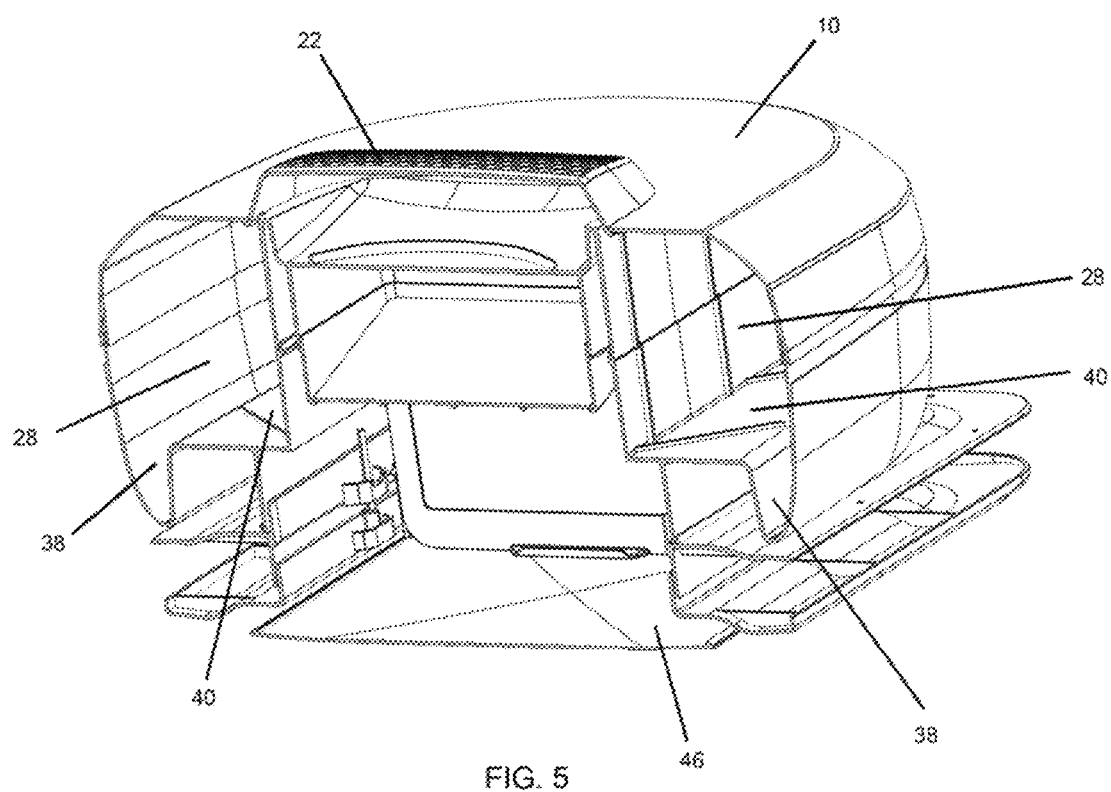
FIG. 5 is a sectional front perspective view of the dust reduction device of FIG. 1.

As best shown in FIG. 5, in one embodiment, each primary inlet channel 28 includes a gutter 38 for collecting moisture during the forward movement of the vehicle. More specifically, each gutter will collect moisture during periods of insufficient airflow whereby there is insufficient centrifugal force to push the moisture through slots 32. Under these circumstances, moisture will pool in the gutters 38 until sufficient airflow is achieved to promote the moisture through each slot. In one embodiment, supplemental drainage holes (not shown) are provided at the end of each gutter 38. These drainage holes (not shown) are in fluid communication with drainage area 34. A plurality of obliquely extending water passages 40 is further provided located on a lower surface of each primary inlet channel 28. The water passages 40 act to provide a path for any contained water into each gutter 38.

Returning now to FIG. 3, the dust reduction device 10 includes an air delivery plenum 42 downstream of the bend portions 30. A main filter 44 is located in the primary airflow path to filter the airflow from the primary airflow path before enters the vehicle. In this respect, the main filter 44 is located upstream of the vehicle opening 18 and downstream of the bend portions 30. In the illustrated embodiment, the main filter 44 is vertically disposed.

A debris catcher 48 is located in the primary airflow path 16 in the bottom portion of the air delivery plenum 42. According to one embodiment, the debris catcher forms a separate subassembly which houses the main filter 44. In this embodiment, the debris catcher is removable from the underside of the dust reduction device 10 so that, when withdrawn, any contained debris may be removed, and/or the main filter may be serviced and/or replaced.

In use, during forward movement of the vehicle 12, air enters both the top and lower portions of inlet aperture 14. The primary airflow entering the top portion of inlet aperture 14 is used for primary airflow path 16, and the air entering the lower portion of inlet aperture 14 is used for the secondary airflow path 20. The air entering the top portion creates the primary airflow path, which is split into two spaced primary inlet channels 28. The airflow travels through each primary inlet channel 28 and then is turned 180° after proceeding through bend portions 30. The primary airflow is then recombined at air delivery plenum 42, whereby it is filtered through main filter 44. As best shown in FIG. 3, the airflow then enters region 50 where it is then promoted in a downward direction towards the vehicle opening 18 due to the pressure created by airflow travelling along the secondary airflow path 20 as discussed below. Any contained moisture with enter through slots 32 and leave the device through drainage hole 36.

The airflow that enters through the lower portion of inlet aperture 14 during forward movement of the vehicle, enters the secondary airflow path 20. It should be understood that the lower portion of the inlet aperture 14 is beneath curved surface 29 and therefore is not separated. Due to the presence of the primary airflow in region 50, the secondary airflow then proceeds in an upwardly direction and out of ventilation exit 22 through region 50 as best shown on FIG. 4.

As a result of the primary and secondary airflow proceeding through device 10 at the same time, the primary airflow is blocked from the ventilation exit and therefore is delivered into the inside of the vehicle to create positive pressure inside the vehicle 12. The inventor has found that the resulting positive pressure substantially restricts ingress of dirt and other contaminated airflow into the vehicle during movement, and there is substantially less dirt and dust in the vehicle when the vehicle has stopped.

When the vehicle is stationary or moving in a non-forward direction, the dust reduction device 10 enters a ventilation stage. Under the circumstances, air exits the vehicle through vehicle opening 18, through region 50 and porous foam portion 24 and then out of the device 10 through ventilation exit 22. Air may also enter the vehicle when stationary either through the primary airflow path or alternatively through the lower portion of the inlet aperture 14. It should be appreciated under the circumstances, the porous foam portions 24 will act as a further air filter and stop insects, bugs or debris entering the vehicle through the vehicle opening 18.

It should be appreciated that the present embodiments provides a dust reduction device 10 that minimises dust ingress in recreational vehicles such as caravans, horse floats, powered vehicles or trailers.

Advantageously, the device 10 works from a low vehicle speed and no electrical power is required. Moreover, the device works automatically with no manual interaction to prepare or enable its operation. More advantageously, the device also restricts bugs and debris from entering the vehicle and also minimises moisture from entering. The device also has a ventilation function whereby cross flow ventilation is provided allowing the free passage of air while stationary for the purpose of occupant ventilation.

It should be appreciated that in the above description of exemplary embodiments of the invention, various features of the embodiments are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

While there has been described the various embodiments, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present teaching.

The invention claimed is:

1. A dust reduction device for a vehicle including:
   an inlet aperture for receiving airflow created as a result of forward movement of the vehicle;
   a primary airflow path leading from said inlet aperture to a vehicle opening; and
   a secondary airflow path leading from said inlet aperture to a ventilation exit,
   wherein, during said forward movement of said vehicle, said primary airflow path is substantially blocked from the ventilation exit by airflow from said secondary airflow path such that airflow from said primary airflow path flows into said vehicle opening and into said vehicle thereby minimising dust ingress in said vehicle.

2. The dust reduction device for a vehicle according to claim 1, wherein during said forward movement of said vehicle, airflow from said primary airflow path creates a positive pressure inside said vehicle thereby minimising dust ingress.

3. The dust reduction device for a vehicle according to claim 1, wherein said primary airflow path is in fluidic communication with said ventilation exit.

4. The dust reduction device for a vehicle according to claim 1, wherein during non-forward movement of said vehicle, a ventilation pathway is created between said vehicle opening and said ventilation exit.

5. The dust reduction device for a vehicle according to claim 1, wherein said primary airflow path includes a pair of horizontally spaced primary inlet channels.

6. The dust reduction device for a vehicle according to claim 5, wherein each primary inlet channel leads to a bend portion for turning the airflow in an opposite direction during said forward movement of said vehicle.

7. The dust reduction device for a vehicle according to claim 6, wherein each bend portion includes a vertically oriented slot for allowing moisture egress.

8. The dust reduction device for a vehicle according to claim 7, wherein each slot is in fluidic communication with a drainage area having a drainage hole disposed on a lower surface thereof.

9. The dust reduction device for a vehicle according to claim 5, wherein each primary inlet channel includes a gutter for collecting water during said forward movement of said vehicle.

10. The dust reduction device for a vehicle according to claim 9, wherein each primary inlet channel includes one or more obliquely extending water passages disposed on a lower surface thereof, said water passages providing a path for any contained water into said gutter.

11. The dust reduction device for a vehicle according to claim 6 including an air delivery plenum downstream of said bend portion.

12. The dust reduction device for a vehicle according to claim 1, further comprising including a filter located in said primary airflow path, said filter being upstream of said vehicle opening.

13. The dust reduction device for a vehicle according to claim 12, wherein said filter is vertically disposed.

14. The dust reduction device for a vehicle according to claim 12 including a debris catcher located in said primary airflow path.

15. The dust reduction device for a vehicle according to claim 14, wherein said debris catcher also houses said filter.

16. The dust reduction device for a vehicle according to claim 15, wherein said debris catcher is removable from the inside of said vehicle such that contained debris may be removed, and/or said filter may be cleaned or replaced.

17. The dust reduction device for a vehicle according to claim 1, wherein said ventilation exit is disposed in a top surface of said dust reduction device.

\* \* \* \* \*